(12) United States Patent
Xie

(10) Patent No.: US 9,829,758 B2
(45) Date of Patent: Nov. 28, 2017

(54) LIQUID CRYSTAL DISPLAY PANEL AND LIQUID CRYSTAL DISPLAY DEVICE

(71) Applicant: Wuhan China Star Optoelectronics Technology Co., Ltd., Wuhan, Hubei (CN)

(72) Inventor: Chang Xie, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 106 days.

(21) Appl. No.: 14/995,075

(22) Filed: Jan. 13, 2016

(65) Prior Publication Data
US 2017/0131603 A1  May 11, 2017

(51) Int. Cl.
G02F 1/1362 (2006.01)
G02F 1/1335 (2006.01)
G02F 1/1339 (2006.01)

(52) U.S. Cl.
CPC .. *G02F 1/136204* (2013.01); *G02F 1/133512* (2013.01); *G02F 1/133514* (2013.01); *G02F 1/1339* (2013.01)

(58) Field of Classification Search
CPC ......... G02F 1/136204; G02F 1/133514; G02F 1/133512; G02F 1/1339; G02F 1/13394; G02F 2001/13396; G02F 1/13392; G02F 1/0107; G02F 1/13338; G06F 2203/04111; G06F 3/0412; G06F 3/044; G06F 2203/04103
See application file for complete search history.

(56) References Cited

U.S. PATENT DOCUMENTS

| | | | | |
|---|---|---|---|---|
| 2006/0097975 A1* | 5/2006 | Lee | ...................... | G02F 1/13338 345/98 |
| 2007/0195029 A1* | 8/2007 | Jeon | ..................... | G02F 1/13338 345/87 |
| 2007/0262967 A1* | 11/2007 | Rho | ..................... | G02F 1/13338 345/173 |
| 2009/0268131 A1* | 10/2009 | Tsai | ..................... | G02F 1/13338 349/106 |
| 2010/0001965 A1* | 1/2010 | Wang | ..................... | G06F 3/045 345/173 |
| 2010/0156827 A1* | 6/2010 | Joo | ..................... | G02F 1/13338 345/173 |
| 2011/0102698 A1* | 5/2011 | Wang | .................. | G02F 1/13338 349/54 |

(Continued)

*Primary Examiner* — Jia Pan
(74) *Attorney, Agent, or Firm* — Andrew C. Cheng

(57) ABSTRACT

The present invention discloses a liquid crystal display panel. A first projection and a first conductive layer are provided on the side of the first substrate facing the second substrate. In a natural state, the first conductive layer and the second substrate are provided with an interval. When the first substrate and the second substrate are close to each other due to external compression, the first conductive layer contacts with the second substrate and thereby electrically connects with the charge storage area on the second substrate, which eliminates the accumulated charge thereon. The present invention further discloses a liquid crystal display device comprising the liquid crystal display panel. The present invention can eliminate the problems of residual image caused by the accumulation of charge due to the static electricity.

7 Claims, 3 Drawing Sheets

(56) References Cited

U.S. PATENT DOCUMENTS

2012/0069258 A1* 3/2012 Fujioka .................. G06F 3/042
                                                    349/42
2013/0176235 A1* 7/2013 Chou .................... G06F 3/0412
                                                    345/173

* cited by examiner

LIQUID CRYSTAL DISPLAY PANEL AND LIQUID CRYSTAL DISPLAY DEVICE

BACKGROUND OF THE INVENTION

1. Field of the Invention

The present invention relates to the technology fields of liquid crystal display technology, and in particular to a liquid crystal display panel and a liquid crystal display device having the liquid crystal display panel.

2. The Related Arts

In the process of forming the liquid crystal display panel, there will be inevitably some residual charges in the liquid crystal cell due to some factors such as the presence of electrostatic. With the increase in the using number of the liquid crystal display panel, the charges will gradually accumulate. These charges will accumulate at both sides of the pixel electrode and the common electrode due to the electric field generated by the gray-scale voltage. When the gray-scale voltage is removed, the residual charge will generate an electric field so that the liquid crystal display panel still displays the previous screen, and then afterimage appears.

SUMMARY OF THE INVENTION

Therefore, the present invention provides a liquid crystal display panel and a liquid crystal display device, which can eliminate the charges accumulated on the substrate and solve the problems of residual image caused by the accumulation of charge due to the static electricity.

The embodiment of the present invention provides a liquid crystal display panel, comprising a first substrate and a second substrate spaced to each other, and liquid crystal molecules filled between the first substrate and the second substrate; a first projection and a first conductive layer are provided on the side of the first substrate facing the second substrate, the first conductive layer is located at the side of the first projection facing the second substrate; wherein, when the first substrate and the second substrate are in a natural state, the first conductive layer and the second substrate are provided with an interval; when the first substrate and the second substrate are close to each other due to external compression, the first conductive layer contacts with the second substrate and thereby electrically connects with the charge storage area on the second substrate, which eliminates the accumulated charge thereon.

Wherein, the first conductive layer electrically connects with at least two charge storage areas with different electrical properties when contacting with the second substrate.

Wherein, on the side of the first substrate facing the second substrate is provided with a second projection, a second conductive layer, a third projection, and a third conductive layer, the second conductive layer is located at the side of the second projection facing the first substrate and electrically connects with a first charge storage area, the third conductive layer is located at the side of the third projection facing the first substrate and electrically connects with a second charge storage area, when the first substrate and the second substrate are close to each other due to external compression, the first conductive layer contacts with the second conductive layer and the third conductive layer simultaneously.

Wherein, on the side of the first projection facing the second substrate is provided with a first groove and a second groove, the first conductive layer covers the first groove and the second groove, when the first substrate and the second substrate are close to each other due to external compression, the first groove and the second groove respectively engage with the second projection and the third projection.

Wherein, the side of the first projection facing the second substrate is a plane, when the first substrate and the second substrate are close to each other due to external compression, the first conductive layer provided on the pane contacts with the second conductive layer and the third conductive layer simultaneously.

Wherein, the first substrate is a color filter substrate, the second substrate is an array substrate, the first charge storage area and the second charge storage area are respectively a pixel electrode and a common electrode provided on the array substrate.

Wherein, the first conductive layer is grounded.

Wherein, the first projection and the first conductive layer are located at the non-display region of the liquid crystal display panel.

Wherein, the liquid crystal display panel further comprises a black matrix located at the non-display region and provided on the first substrate or the second substrate, the first conductive layer overlaps the black matrix.

The embodiment of the present invention provides a liquid crystal display device comprising any one liquid crystal display panel as mentioned above.

The liquid crystal display panel and the liquid crystal display device according to the embodiment of the present invention provide a first projection and a first conductive layer on one of two substrates spaced to each other. When in a natural state, the first conductive layer and the second substrate are provided with an interval. When the two substrates are close to each other due to external compression, the first conductive layer contacts with the other substrate and thereby electrically connects with the charge storage area on the second substrate, which eliminates the accumulated charge thereon and solve the problems of residual image caused by the accumulation of charge due to the static electricity.

DETAILED DESCRIPTION OF THE PREFERRED EMBODIMENTS

The core purpose of the embodiment of the present invention is to provide a projection and a conductive layer on the side of the first substrate facing the second substrate. When in a natural state, the conductive layer and the second substrate are provided with an interval. When the two substrates are close to each other due to external compression, the conductive layer contacts with the second substrate and thereby electrically connects with the charge storage area on the second substrate, which eliminates the accumulated charge thereon and solve the problems of residual image caused by the accumulation of charge due to the static electricity.

Wherein, the external compression making the two substrates close to each other comes from the touch operation of the user to the liquid crystal display panel with touch function. Therefore, it can eliminate the charges during the touch operation without additional pressing operation, which is very convenient to eliminate residual images.

According to the specific structure of the charge accumulation area, the added projection and conductive layer have different structures. The clear and complete descriptions according to the exemplary embodiment of the present invention accompanying with the drawings in the embodiments of the present invention are as follows.

Figure 1:
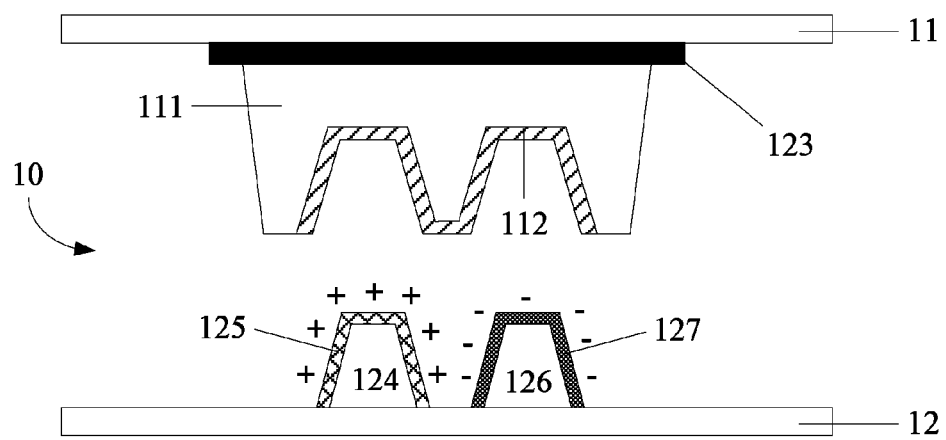
FIG. 1 is a sectional view illustrating the structure of the liquid crystal display panel according to an embodiment of the present invention.

FIG. 1 is a sectional view illustrating the structure of the liquid crystal display panel according to an embodiment of the present invention. As shown in FIG. 1, the liquid crystal display panel 10 comprises a first substrate 11 and a second substrate 12 spaced to each other, and liquid crystal molecules filled between the first substrate 11 and the second substrate 12. Wherein, the first substrate 11 is a color filter substrate (CF), correspondingly, the second substrate 12 is an array substrate (also known as thin film transistor substrate, TFT substrate).

A first projection 111 and a first conductive layer 112 are provided on the side of the first substrate 11 facing the second substrate 12, the first conductive layer 112 is located at the side of the first projection 111 facing the second substrate 12. Wherein, when the first substrate 11 and the second substrate 12 are in a natural state (that is unaffected by external compression and close to each other), the first conductive layer 112 and the second substrate 12 are provided with an interval. Combining with FIG. 2, when the first substrate 11 and the second substrate 12 are close to each other due to external compression (an arrow shown in diagram only shows the first substrate 11 acted upon by an external force), the first conductive layer 112 contacts with the second substrate 12. Specifically, the first conductive layer 112 electrically connects with the charge storage area on the second substrate 12, which eliminates the accumulated on the second substrate 12.

Figure 2:
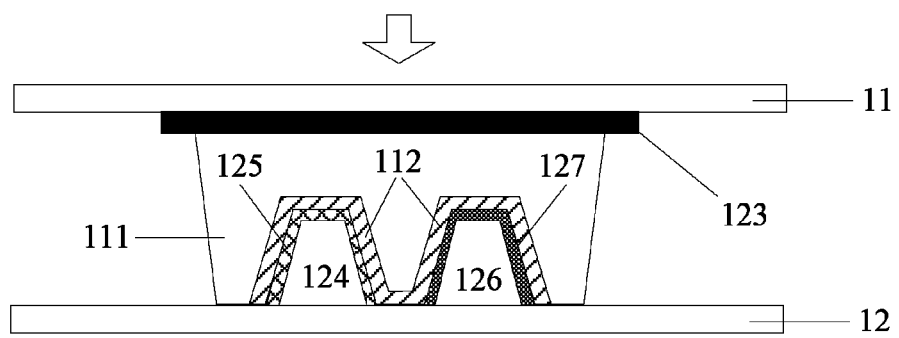
FIG. 2 is a schematic view illustrating the structure of the liquid crystal display as shown in FIG. 1 squeezed by external compression.
Figure 3:
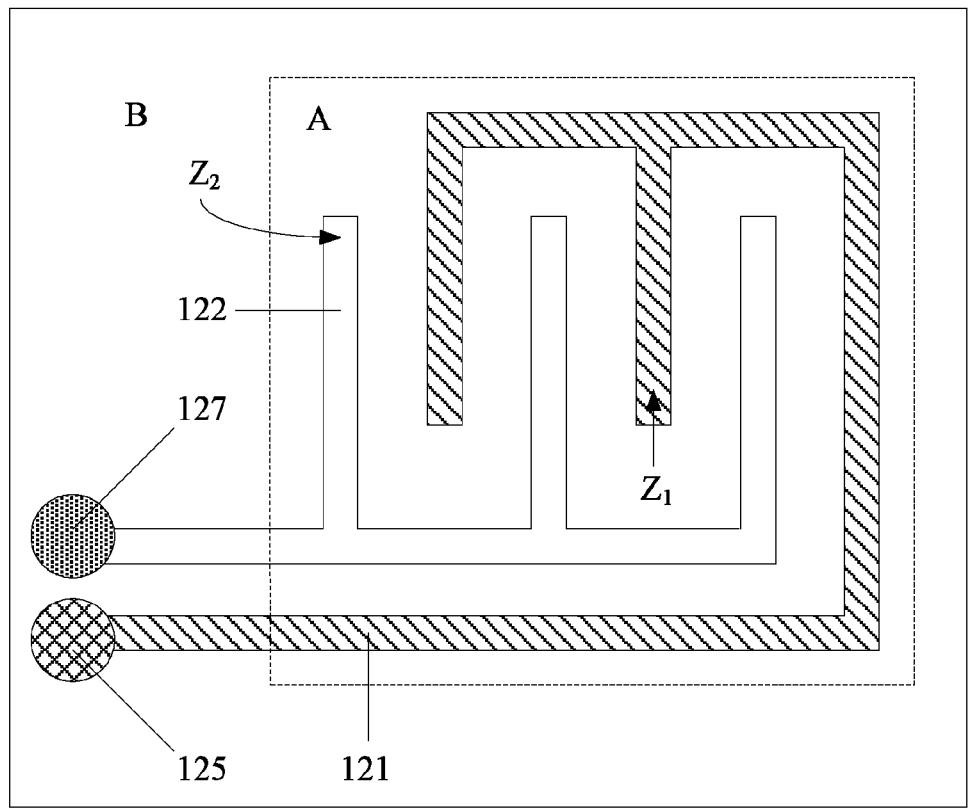
FIG. 3 is a top view illustrating the structure of the liquid crystal display panel according to an embodiment of the present invention.

In the embodiment of the present invention, when the first conductive layer 112 contacts with the second substrate 12, it can electrically connects with at least two charge storage areas with different electrical properties. Referring to FIGS. 2 and 3, for example, the charge storage area comprises a first charge storage area $Z_1$ and a second charge storage area $Z_2$. When the two charge storage areas $Z_1$ and $Z_2$ respectively electrically connects with the pixel electrode 121 and the common electrode 122 provided on the array substrate, the first conductive layer 112 receives the positive charge accumulated on both sides of the pixel electrode 121 and the negative charge accumulated on both sides of the common electrode 122 and neutralizes, which eliminates the charges accumulated on the second substrate 12. Of course, in order to avoid that the positive and the negative charges fail to neutralize, the first conductive layer 112 in the embodiment of the present invention can be grounded, so that the residual charges without neutralizing guide to the earth.

The first conductive layer 112 can be made of indium tin oxide (ITO) or other conductive materials such as metal, which is formed on the side of the first projection 111 facing the second substrate 12 by sputtering. The first projection 111 can be made of transparent resin material, which also can be used as a photo spacer (PS) for the liquid crystal display panel 10, which is used for maintaining the distance between the first substrate 12 and second substrate 11, that is cell thickness.

Referring to FIG. 3 again, the first projection 111 and the first conductive layer 112 are located at the non-display region B of the liquid crystal display panel 10, which further overlap a black matrix 123 provided on the second substrate 12. That is, the projections of the first projection 111 and the first conductive layer 112 fall within the area of the black matrix 123 along the direction perpendicular to the sight direction of the liquid crystal display panel 10, which will not affect the pixel aperture ratio of the liquid crystal display panel 10 and ensure the predetermined required display area A.

Referring to FIG. 1, on the side of the first substrate 11 facing the second substrate 12 is provided with a second projection 124, a second conductive layer 125, a third projection 126, and a third conductive layer 127. The second conductive layer 125 is located at the side of the second projection 124 facing the first substrate 11 and electrically connects with the pixel electrode 121, so that the positive charges on both sides of the pixel electrode 121 are transmitted to the first conductive layer 112. The third conductive layer 127 is located at the side of the third projection 126 facing the first substrate 11 and electrically connects with the common electrode 122, so that the negative charges on both sides of the common electrode 122 are transmitted to the first conductive layer 112. Correspondingly, on the side of the first projection 111 facing the second substrate 12 is provided with a first groove 113 and a second groove 114, the first conductive layer 112 covers the first groove 113 and the second groove 114.

Combining with FIG. 2, when the first substrate 11 and the second substrate 12 are close to each other due to external compression, the first conductive layer 112 contacts with the second conductive layer 125 and the third conductive layer 127 simultaneously, the first groove 113 and the second projection 124 respectively engage with the second groove 114 and the third projection 126. The design of the first projection 111, the second projection 124, and the third projection 126 make the first projection 111 in the engagement and hardly shift after extrusion by external compression, which reduces the consequent light leakage and ensures the quality of the display image of the liquid crystal display panel 10 while pressing.

Figure 4:
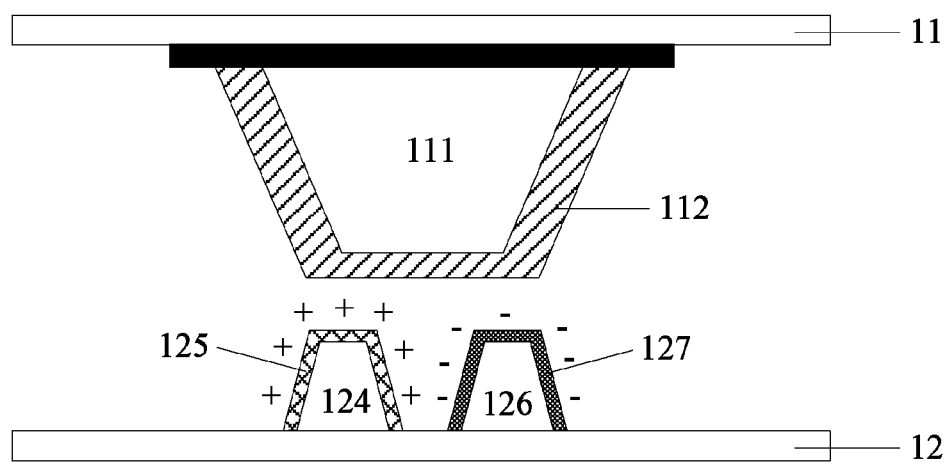
FIG. 4 is a sectional view illustrating the structure of the liquid crystal display panel according to another embodiment of the present invention.
Figure 5:
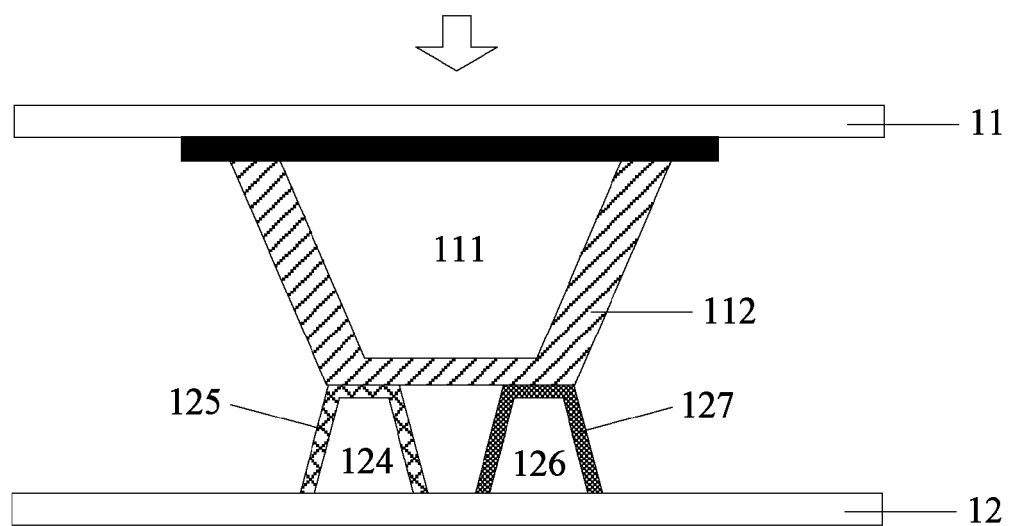
FIG. 5 is a schematic view illustrating the structure of the liquid crystal display as shown in FIG. 4 squeezed by external compression.

FIG. 4 is a sectional view illustrating the structure of the liquid crystal display panel according to another embodiment of the present invention. Wherein, for convenience of description, it uses the same labels as shown in the figure for the same structural elements. As shown in FIG. 4, the difference from the embodiment as shown in FIG. 1 is that the side of the first projection 111 in the present embodiment facing the second substrate 12 is a plane. Further combining with FIG. 5, when the first substrate 11 and the second substrate 12 are close to each other due to external compression, the first conductive layer 112 provided on the plane contacts with the second conductive layer 125 and the third conductive layer 127 simultaneously.

Figure 6:
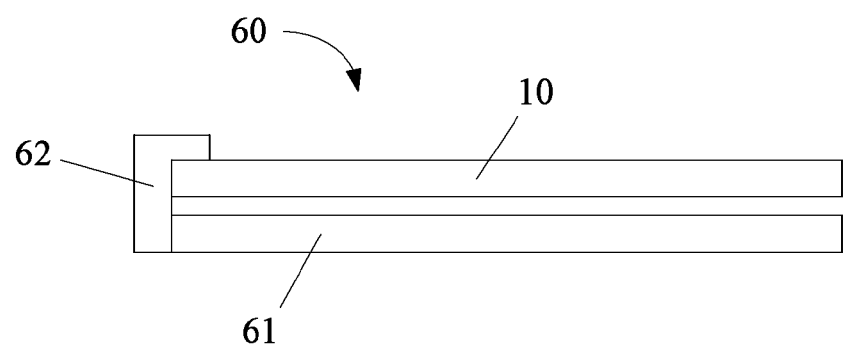
FIG. 6 is a sectional view illustrating the structure of the liquid crystal display device according to an embodiment of the present invention.

The embodiment of the present invention further provides a liquid crystal display device 60 as shown in FIG. 6, which comprises the liquid crystal display panel 10 as shown in FIGS. 1 and 4 and other components, such as backlight module 61 and front frame unit 62. Because the liquid crystal display device 60 has the above design of the liquid crystal display panel 10, it also has the same beneficial effect.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A liquid crystal display panel, comprising a first substrate and a second substrate spaced to each other, and liquid crystal molecules filled between the first substrate and the second substrate;
    wherein, a first projection and a first conductive layer are provided on the side of the first substrate facing the second substrate, the first conductive layer is located at the side of the first projection facing the second substrate;
    wherein, when the first substrate and the second substrate are in a natural state, the first conductive layer and the second substrate are provided with an interval; when the first substrate and the second substrate are close to each other due to external compression, the first conductive layer contacts with the second substrate and thereby electrically connects with a charge storage area on the second substrate, which eliminates the accumulated charge thereon;
    wherein, the first conductive layer electrically connects with at least two charge storage areas with different electrical properties when contacting with the second substrate;
    wherein, on the side of the second substrate facing the first substrate is provided with a second projection, a second conductive layer, a third projection, and a third conductive layer, the second conductive layer is located at the side of the second projection facing the first substrate and electrically connects with a first charge storage area, the third conductive layer is located at the side of the third projection facing the first substrate and electrically connects with a second charge storage area, when the first substrate and the second substrate are close to each other due to external compression, the first conductive layer contacts with the second conductive layer and the third conductive layer simultaneously;
    wherein, the first substrate is a color filter substrate, the second substrate is an array substrate, the first charge storage area and the second charge storage area are respectively a pixel electrode and a common electrode provided on the array substrate.

2. The liquid crystal display panel as claimed in claim 1, wherein, on the side of the first projection facing the second substrate is provided with a first groove and a second groove, the first conductive layer covers the first groove and the second groove, when the first substrate and the second substrate are close to each other due to external compression, the first groove and the second groove respectively engage with the second projection and the third projection.

3. The liquid crystal display panel as claimed in claim 1, wherein, the side of the first projection facing the second substrate is a plane, when the first substrate and the second substrate are close to each other due to external compression, the first conductive layer provided on the plane contacts with the second conductive layer and the third conductive layer simultaneously.

4. The liquid crystal display panel as claimed in claim 1, wherein, the first conductive layer is grounded.

5. The liquid crystal display panel as claimed in claim 1, wherein, the first projection and the first conductive layer are located at the non-display region of the liquid crystal display panel.

6. The liquid crystal display panel as claimed in claim 5, wherein, the liquid crystal display panel further comprises a black matrix located at the non-display region and provided on the first substrate or the second substrate, the first conductive layer overlaps the black matrix.

7. A liquid crystal display device, comprising the liquid crystal display panel as claimed in claim 1.

* * * * *